United States Patent [19]

Snell

[11] 3,868,045

[45] Feb. 25, 1975

[54] ARTICLE CONVEYING

[75] Inventor: Spencer A. Snell, Longmont, Colo.

[73] Assignee: International Business Machines Corporation, Armonk, N.Y.

[22] Filed: Oct. 11, 1973

[21] Appl. No.: 405,609

[52] U.S. Cl..................... 221/194, 193/18, 193/24
[51] Int. Cl............................................ B65g 11/20
[58] Field of Search ............................... 193/18–20, 193/24, 32, 40, 43 B, 43 D; 198/27; 221/193–196, 255–257

[56] References Cited
UNITED STATES PATENTS

| | | | |
|---|---|---|---|
| 1,043,548 | 11/1912 | Stender | 193/18 |
| 1,741,782 | 12/1929 | La Rocque | 198/27 X |
| 3,497,047 | 2/1970 | Mobley | 193/18 |

Primary Examiner—Evon C. Blunk
Assistant Examiner—W. Scott Carson
Attorney, Agent, or Firm—Herbert F. Somermeyer

[57] ABSTRACT

An article conveying apparatus converts vertical motion to horizontal motion. An arcuate slide moves the article from a vertical orientation to a horizontal orientation then onto a horizontally pivoted cradle. The cradle is offset pivoted permitting the article to pivot the cradle to a discharge position. Then the article rolls off the cradle down an inclined ramp to an output port. Suitable guiding and cushioning is provided.

10 Claims, 2 Drawing Figures

PATENTED FEB 25 1975 3,868,045

ARTICLE CONVEYING

BACKGROUND OF THE INVENTION

The present invention relates to article handling and conveying, particularly such apparatus useful for conveying record tape-containing cartridges between a vertical port and a horizontal port.

It has been desired over the last several years to provide large on-line data bases. To this end, the Burke, et al., U.S. Pat. No. 2,941,738 and 2,941,739 show automatic tape handling apparatus employing spooled magnetic tape. For enhancing access times to such tapes, the length of the tape on a given spool is reduced in length while being increased in width, such as shown by the cartridge design in the Rinkleib U.S. Pat. No. 3,631,971. As a result of these geometric changes, autoloading requirements, i.e., transfers of the tape-containing cartridge between an accessor in a tape library and a tape drive or read/write unit is radically changed.

An important factor in the design of such autoloading apparatus is the competitive nature of the data processing industry. Accordingly, it is highly desirable that the autoloading apparatus be low-cost and operate with minimum power consumption. Accordingly, where it is possible, it is desired to use gravity in transferring articles from one point to another, as well as actuating all of the apparatus incident to such conveying. Such apparatus should also be rapid and not generate debris.

Further, it has been found that an improvement over the Rinkleib cartridge, supra, can be had by making the tape cartridge circular cylindrical in nature with a hollow cylindrical sleeve covering a single flanged tape spool, such an article constitutes the article to be conveyed by the preferred embodiment of the present invention.

SUMMARY OF THE INVENTION

It is an object of the present invention to provide a simplified, low-cost, effective, rapid, article conveying apparatus which converts the vertical motion to a horizontal stop position entirely with gravity actuation.

In accordance with the present invention, the article conveying apparatus receives an article in a substantially vertical direction and stores same for removal along a substantially horizontal direction. Receiving means includes an arcuate ramp which changes the direction of motion of the article from vertical to horizontal. At the end of the ramp, an elongated cradle is pivotable about its elongated axis and receives the article. The pivot axis is offset such that as the article enters the cradle, it pivots toward a linear descending ramp. The article rolls off the cradle, onto the ramp, and down into an exit position next to an exit port. An exit port preferably has a flexible article retaining collar to prevent the article from bouncing out of the port. Suitable guiding is provided, as well as impact cushioning.

The foregoing and other objects, features, and advantages of the invention will be apparent from the following more particular description of a preferred embodiment of the invention as illustrated in the accompanying drawing.

THE DRAWING

DETAILED DESCRIPTION

Figure 1:
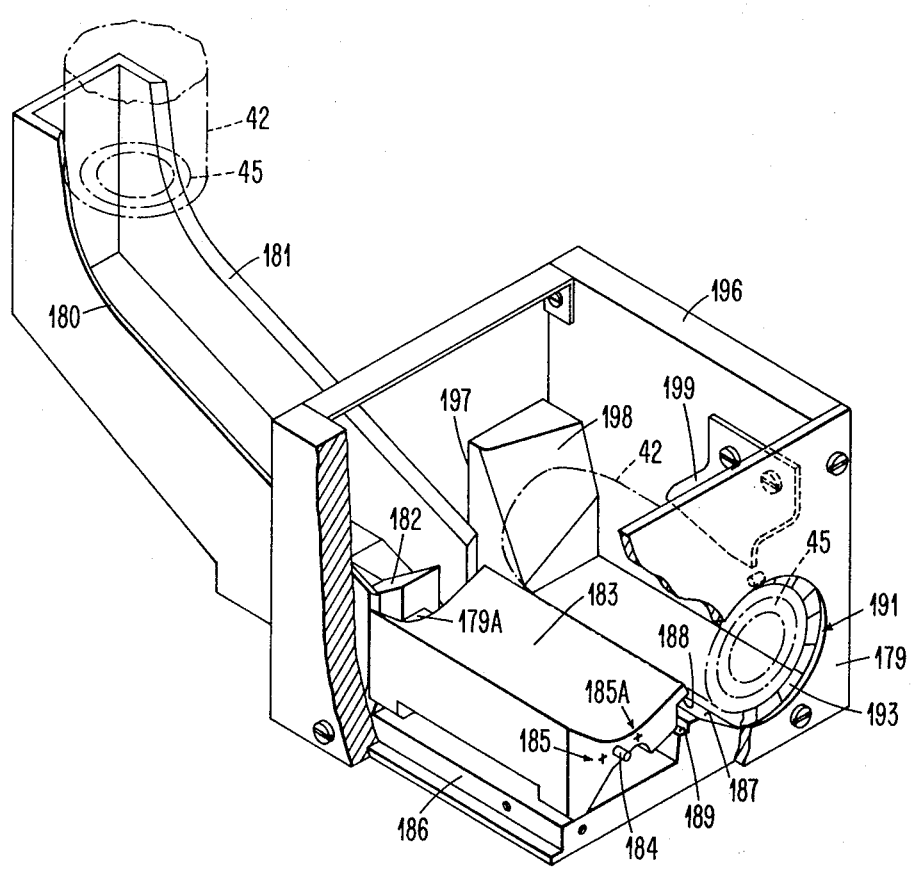
FIG. 1 is a simplified diagrammatic showing of the invention.
Figure 2:
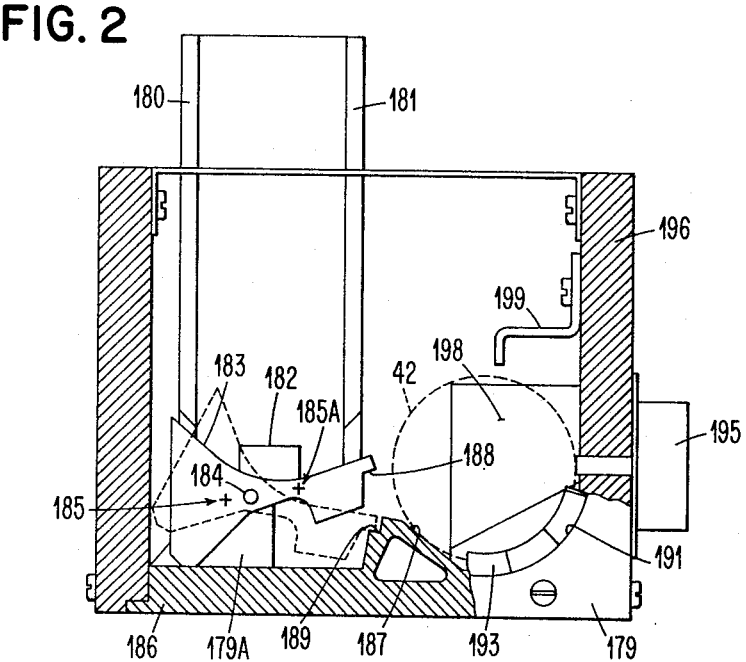
FIG. 2 is a simplified diagrammatic side sectional view of the invention showing the relationship of a pivotable cradle and an inclined ramp.

Referring to the drawing, like numerals indicate like parts and structural features in the two views. The illustrated apparatus conveys a descending article 42 from the input port immediately above arcuate ramps 180 and 181 to an output port at 191 having a horizontal axis of exit. Eventually, magnetic end 45 of cartridge 42 must face the front wall 179 of the exit apparatus. All actions are gravity actuated.

From the output of a tape recorder (not shown), tape-containing cartridge 42 drops downwardly to slide on arcuate ramps 180 and 181. Ramps 180 and 181 are spaced apart to receive and guide the cartridge from a vertical descending motion to a horizontal motion. In some embodiments, the "vertical" motion can be 20° or so off true vertical, for example; the precise relation to true vertical or horizontal is not critical to practicing the present invention. Descending cartridge 42 rides over spring-loaded stop or interposer 182 and thence onto pivoted cradle 183. Cradle 183 is mounted for pivoting about pivot pin 184. Pivot pin 184 is journaled in front wall 179 and upstanding standard 179A located intermediate guides 180 and 181 and cradle 183. The upper surface of cradle 183 may be designed to receive cylindrical cartridge 42. When in the illustrated position, cradle 183 bears against lower wall 186 under the gravitational urging of the center of gravity of the cradle as at 185. Cartridge 42 sliding onto cradle 183 shifts the center of gravity to the opposite side of pivot pin 184 as at 185a. Cradle 183 then pivots until forward edge 188 engages upward opening groove 189 of descending ramp 187. At this position, cartridge 42 rolls onto ramp 187 and then into the exit position wherein metal plate 45 is facing outwardly through aperture 191 of front wall 179.

A flexible plastic liner 193 rims the edge of aperture 191 to prevent cartridge 42 from bouncing forwardly through the aperture, yet permits an accessing mechanism (not shown) to extract the cartridge 42. Such accessing mechanism operates in a tape storage library, such as illustrated by Burke, et al., supra.

Rear wall 197 may have a lower guide 198 guiding and positioning the cartridge 42 into an exit position. Additionally, upper guide 199 may prevent the cartridge from bouncing upwardly and getting caught crosswise in the apparatus. Plural cartridges 42 may be positioned in the apparatus at one time, one in the exit position immediately aligned with aperture 191, one residing on exit ramp 187, and in selected embodiments one in cradle 183.

To signify that a cartridge is to be exited to suitable accessor apparatus (not shown), a switch 195 is suitably mounted into side wall 196. When closed, it signifies that a cartridge is in exit apparatus.

To cushion cartridge 42 when it hits front wall 179, a suitable pad is glued onto the front wall just above cradle 183. in a similar manner, wall 196 may have a cushion to reduce cartridge 42 bouncing within the apparatus.

While the invention has been particularly shown and described with reference to a preferred embodiment thereof, it will be understood by those skilled in the art that various changes in form and detail may be made

What is claimed is:

1. Article handling apparatus having an upwardly opening input port and a side opening output port, and adapted to handle an elongated cylindrical article, the improvement including in combination:

a concave arcuate slide extending downwardly from adjacent said input port and having an approximate horizontal end portion remote from said input port;

a horizontally pivoted, horizontally elongated cradle having one end adjacent said slide for receiving articles therefrom, said cradle including a counter weight portion along a first elongated side, a pivot member pivotally supporting said cradle closer to a second elongated side than said first elongated side such that the cradle is horizontal when empty and pivots downwardly toward said second side when an article is thereon;

a spring-loaded interposer at said horizontal end portion positioned to yield to an article on said slide but nonyieldable to an article on said cradle, and a planar ramp extending downwardly from said second elongated side to said output port.

2. The apparatus set forth in claim 1 for handling cylindrical elongated articles and said cradle having a concave upper surface.

3. The article handling apparatus set forth in claim 1 wherein said planar ramp has an extent substantially equal to the length of the cylindrical article to be handled by said apparatus; and further including restraining means in said output port disposed from said planar ramp a distance approximately equal to but always greater than the thickness of an article to be handled and disposed vertically above said ramp for restraining said article from bouncing upwardly.

4. The article handling apparatus set forth in claim 3 further including an inclined plane member in said output port adjacent said concave arcuate slide, and having a lower portion adjacent said one end of said slide and having an upper portion horizontally displaced from said one end portion towards said upwardly opening input port whereby said inclined plane member tends to guide articles from said cradle toward said side opening output port.

5. The article handling apparatus set forth in claim 1 further including an enclosure with openings for receiving articles from said upwardly opening input port and having aperture in a side wall opposite said input port and in juxtaposition to said planar ramp such that said output port constitutes a portion of said enclosure adjacent said cradle and including said aperture, said aperture having a cross-sectional configuration similar to the cross-sectional configuration of an article to be handled, and a flexible liner affixed to one said side wall and extending into said aperture for yieldably restraining an article in said output port.

6. The article handling apparatus set forth in claim 5 wherein said enclosure includes a bottom wall, said bottom wall supporting said horizontally pivoted horizontally elongated cradle, and said counter weight portion depending towards said bottom wall for stopping pivoting of said cradle.

7. The article handling apparatus set forth in claim 6 wherein said enclosure has a second side wall facing said horizontally pivoted cradle and forming a stop wall of said output port for stopping rolling of said article and extending perpendicularly to said one wall having said aperture, and an electrical switch in said second side wall having an actuator extending into said output port for being actuated by an article as it enters said output port.

8. A gravity actuated article terminal for receiving and maintaining orientation of an axially elongated cylindrical article, the improvement including in combination;

receiving means having a substantially vertical input port for receiving an elongated cylindrical article along a vertical travel path and having a substantially horizontal end portion disposed remote from said input port;

an elongated cradle having one end adjacent said end portion to receive an article from said receiving means, said elongated cradle being pivotable about a horizontal axis and means in the cradle yieldably pivotably biasing to an article-receiving position and having an elongated exit side disposed parallel to said horizontal axis, said horizontal axis being disposed such that an article on said cradle overrides said yieldable biasing to pivot the cradle to lower said cradle exit side to an article exit position;

a yieldably biased interposer at said horizontal end portion adjacent said one end of said cradle and positioned to yield to an article in said receiving means for allowing such article to move into said cradle and nonyieldable to an article in said cradle for restraining same from reentering said receiving means;

an article exit ramp having an upper entrance end portion adjacent said exit side at a level approximately at said exit position and having a planar inclined exit surface along a plane tangent to a circular cylinder concentric to said horizontal axis; and an article exit location adjacent said exit surface and elongated parallel to said horizontal pivot axis.

9. The gravity actuated article terminal set forth in claim 8 wherein said article exit ramp has a horizontally elongated upwardly opening groove extending parallel to said horizontal axis and being joined to said upper entrance end portion, and said cradle exit side having an elongated forward edge facing said upwardly opening groove and adapted to fit therein for stopping said cradle in an exit position such that said upper entrance end portion is aligned vertically with an upper surface of said horizontally pivoted cradle.

10. The gravity actuated article terminal set forth in claim 8 further including an enclosure with an opening for receiving articles from said receiving means, said enclosure supporting said cradle and said exit ramp, and including said exit location, said enclosure having an aperture opening to said exit location, and said aperture having a cross-sectional configuration similar to the cross-sectional configuration of an article to be handled, and a flexible liner affixed to one said side wall and extending into said aperture for yieldable restraining an article in said output port.

* * * * *